United States Patent
Takaoka et al.

(10) Patent No.: US 9,765,223 B2
(45) Date of Patent: Sep. 19, 2017

(54) COATED STEEL SHEET AND EXTERIOR BUILDING MATERIAL

(71) Applicant: NISSHIN STEEL CO., LTD., Tokyo (JP)

(72) Inventors: Shinji Takaoka, Chiba (JP); Takahide Hayashida, Osaka (JP); Koichiro Ueda, Chiba (JP); Yasunori Fujimoto, Chiba (JP); Naho Kawahara, Tokyo (JP); Katsumi Owa, Chiba (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/124,545

(22) PCT Filed: Mar. 24, 2014

(86) PCT No.: PCT/JP2014/001666
§ 371 (c)(1),
(2) Date: Sep. 8, 2016

(87) PCT Pub. No.: WO2015/140837
PCT Pub. Date: Sep. 24, 2015

(65) Prior Publication Data
US 2017/0015837 A1    Jan. 19, 2017

(30) Foreign Application Priority Data

Mar. 19, 2014 (JP) ................. 2014-056502

(51) Int. Cl.
| | | |
|---|---|---|
| C09D 5/08 | (2006.01) |
| C09D 133/02 | (2006.01) |
| C09D 7/12 | (2006.01) |
| C23C 22/73 | (2006.01) |
| B32B 15/18 | (2006.01) |

(52) U.S. Cl.
CPC .............. C09D 5/084 (2013.01); B32B 15/18 (2013.01); C09D 7/1283 (2013.01); C09D 133/02 (2013.01); C23C 22/73 (2013.01); *B32B 2307/714* (2013.01); *B32B 2419/00* (2013.01)

(58) Field of Classification Search
None
See application file for complete search history.

(56) References Cited

U.S. PATENT DOCUMENTS 4,740,393 A * 4/1988 Cody ..................... C09D 5/084
106/14.34
2009/0274926 A1* 11/2009 Okai ..................... C09D 5/084
428/626

FOREIGN PATENT DOCUMENTS

| JP | H09-122579 A | 5/1997 |
|---|---|---|
| JP | H11-42735 A | 2/1999 |
| JP | 2000334374 A | * 12/2000 |
| JP | 2002-294154 A | 10/2002 |
| JP | 2003-268578 A | 9/2003 |
| JP | 2005-028822 A | 2/2005 |
| JP | 2007-126565 A | 5/2007 |
| JP | 2009-045923 A | 3/2009 |
| JP | 2010-208067 A | 9/2010 |
| JP | 2011-207132 A | 10/2011 |
| JP | 2012-136025 A | 7/2012 |

OTHER PUBLICATIONS

JP2000334374_MT Dec. 5, 2000.*
International Search Report from International Application No. PCT/JP2014/001666 mailed May 13, 2014.
Extended European Search Report issued in EP 14886591.8, dated Jul. 6, 2017.

* cited by examiner

*Primary Examiner* — Vera Katz
(74) *Attorney, Agent, or Firm* — Brundidge & Stanger, P.C.

(57) ABSTRACT

A coated steel sheet comprises: a steel sheet; a primer coating film which is arranged on the steel sheet and comprises an anti-corrosive pigment and an aggregate composed of primary particles; and a top coating film which is arranged on the primer coating film. The anti-corrosive pigment comprises at least one compound selected from the group consisting of a bivalent tin salt, a trivalent vanadium salt, a tetravalent vanadium salt, a tetravalent molybdenum salt, an oxycarboxylic acid salt, an ascorbic acid, a phosphorous acid salt and a hypophosphorous acid salt.

4 Claims, No Drawings

COATED STEEL SHEET AND EXTERIOR BUILDING MATERIAL

TECHNICAL FIELD

The present invention relates to a coated steel sheet excellent in corrosion resistance and scratch resistance, and an exterior building material including the coated steel sheet.

BACKGROUND ART

A problem in use of a coated steel sheet for an exterior building material or the like is the generation of red rust. For example, in a region which does not suffer from salt damage (salt damage-free region), red rust is generated on an exposed base steel portion of a coated steel sheet, such as an edge surface and a bent portion, and the red rust causes a problem of deterioration of appearance. The generation of red rust can be effectively prevented by subjecting a steel sheet to chromate-based chemical conversion treatment or adding a chromic acid-based anti-corrosive pigment into an undercoating film. However, a coated steel sheet which does not cause elution of hexavalent chromium has been recently required from the viewpoint of reduction of environmental loads.

For a technique to prevent the generation of red rust on an exposed base steel portion without using a chromate-based chemical conversion treatment solution or a chromic acid-based anti-corrosive pigment, use of manganese phosphate or manganese phosphite as an anti-corrosive pigment is proposed (see PTL 1). Manganese phosphate and manganese phosphite are eluted onto an exposed base steel portion to form a protective coating film in an early stage. By virtue of this protective coating film, prevention of the generation of red rust on an exposed base steel portion is achieved without using a chromate-based chemical conversion treatment solution or chromic acid-based anti-corrosive pigment.

When a coated steel sheet is used for an exterior building material or the like, scratch resistance is required in some cases. For a technique to enhance the scratch resistance of a coated steel sheet, addition of a silica particle having a particle diameter of 1 to 5 μm into an undercoating film is proposed (see PTL 2). Addition of a silica particle into an undercoating film to increase the surface roughness of the undercoating film broadens the contact area between the undercoating film and a topcoating film, which enhances the adhesion strength of the topcoating film to the undercoating film. As a result, enhancement of the scratch resistance of a coated steel sheet is achieved.

CITATION LIST

Patent Literature

PTL 1
Japanese Patent Application Laid-Open No. 2010-208067
PTL 2
Japanese Patent Application Laid-Open No. 9-122579

SUMMARY OF INVENTION

Technical Problem

For means to enhance both of the corrosion resistance and scratch resistance of a coated steel sheet, addition of an anti-corrosive pigment which is easily eluted into an undercoating film (e.g., manganese phosphate or manganese phosphite) and a silica particle which can increase the surface roughness of an undercoating film is contemplated with reference to PTL 1 and PTL 2. However, it has been found from preliminary experiments conducted by the present inventors that a coated steel sheet obtained in such a manner is excellent in scratch resistance, but the corrosion resistance is drastically lowered over time.

An object of the present invention is to provide a coated steel sheet excellent in both corrosion resistance and scratch resistance, and an exterior building material including the coated steel sheet.

Solution to Problem

The present inventors have found that the above problem can be solved by adding an anti-corrosive pigment which is easily eluted into an undercoating film and an aggregate being a primary particle, and further studied to complete the present invention.

Specifically, the present invention relates to the following coated steel sheets and exterior building material.

[1] A coated steel sheet includes:
a steel sheet;
an undercoating film disposed on the steel sheet and containing an anti-corrosive pigment and an aggregate being an primary particle; and
a topcoating film disposed on the undercoating film, wherein
the anti-corrosive pigment is one or two or more compounds selected from the group consisting of a divalent tin salt, a trivalent vanadium salt, a tetravalent vanadium salt, a tetravalent molybdenum salt, an oxycarboxylate salt, ascorbic acid, a phosphite salt, and a hypophosphite salt.

[2] The coated steel sheet according to [1], wherein the aggregate satisfies Expression 1 and Expression 2:

$$D_{10} \geq 0.6T \quad \text{(Expression 1)}$$

$$D_{90} < 2.0T \quad \text{(Expression 2)}$$

wherein, $D_{10}$ is a 10% particle diameter (μm) of the aggregate in a number-based cumulative particle size distribution; $D_{90}$ is a 90% particle diameter (μm) of the aggregate in a number-based cumulative particle size distribution; and T is a film thickness (μm) of the undercoating film at a portion containing none of the aggregate.

[3] The coated steel sheet according to [1] or [2], wherein a percentage of the aggregate based on a solid content of the undercoating film is 1 vol % or more and less than 10 vol %.

[4] The coated steel sheet according to any one of [1] to [3], wherein the steel sheet has been subjected to chromium-free chemical conversion treatment.

[5] An exterior building material includes the coated steel sheet according to any one of [1] to [4].

Advantageous Effects of Invention

The present invention can provide a coated steel sheet and an exterior building material which are excellent in both corrosion resistance and scratch resistance.

DESCRIPTION OF EMBODIMENTS

A coated steel sheet according to the present invention includes: a steel sheet (non-coated sheet); an undercoating film formed on the steel sheet; and a topcoating film formed on the undercoating film. In the following, constituents of the coated steel sheet according to the present invention will be described.

(Non-Coated Sheet)

The type of the steel sheet as a non-coated sheet is not particularly limited. Examples of the non-coated sheet include cold-rolled steel sheets, zinc-plated steel sheets, Zn—Al alloy-plated steel sheets, Zn—Al—Mg alloy-plated steel sheets, aluminum-plated steel sheets, and stainless steel sheets (including austenitic, martensitic, ferritic, and ferrite-martensite biphasic stainless steel sheets). The non-coated sheet is preferably a hot-dip 55% Al—Zn alloy-plated steel sheet from the viewpoints of corrosion resistance, weight saving, and cost performance. The steel sheet may be subjected to a known precoating treatment such as degreasing and pickling in advance. The sheet thickness of the steel sheet is not particularly limited, and can be appropriately set in accordance with an application of the coated steel sheet. For example, the thickness of the steel sheet is approximately 0.1 to 2 mm The steel sheet (non-coated sheet) may be subjected to chemical conversion treatment in advance from the viewpoint of enhancement of the corrosion resistance and the adhesion to the coating film (scratch resistance) of the coated steel sheet. The type of the chemical conversion treatment is not particularly limited. Examples of the chemical conversion treatment include chromate treatment, chromium-free treatment, and phosphate treatment. From the viewpoint of reduction of environmental loads, chromium-free chemical conversion treatment is preferred.

The chemical conversion treatment can be carried out by using a known method, for example, by applying a chemical conversion treatment solution on the surface of the steel sheet by using a roll coating method, a spin coating method, a spraying method, or the like, followed by drying without washing with water. The drying temperature and drying duration are not particularly limited as long as the moisture can be evaporated. From the viewpoint of productivity, the drying temperature is preferably in the range of 60 to 150° C. in an ultimate sheet temperature and the drying duration is preferably in the range of 2 to 10 seconds. The amount of a chemical conversion treatment coating film to be deposited is not particularly limited as long as the amount is in a range effective for enhancement of the corrosion resistance and the adhesion to the coating film. In the case of a chromate coating film, for example, the amount of deposition can be adjusted so that the amount of deposition in terms of the total Cr is 5 to 100 mg/m$^2$. In the case of a chromium-free coating film, the amount of deposition can be adjusted to 10 to 500 mg/m$^2$ for a Ti—Mo composite coating film, and for a fluoroacid-containing coating film can be adjusted so that the amount of deposition in terms of fluorine or the amount of deposition in terms of the total metal elements is in the range of 3 to 100 mg/m$^2$. In the case of a phosphate coating film, the amount of deposition can be adjusted to 5 to 500 mg/m$^2$.

(Undercoating Film)

The undercoating film is formed on the surface of the steel sheet or chemical conversion treatment coating film. The undercoating film contains an anti-corrosive pigment and an aggregate, and enhances the corrosion resistance, adhesion to the coating film (scratch resistance), etc. of the coated steel sheet.

The type of a resin (base resin) contained in the undercoating film is not particularly limited. Examples of the resin contained in the undercoating film include an epoxy resin, an acrylic resin, and a polyester.

An anti-corrosive pigment is blended in the undercoating film from the viewpoint of enhancement of the corrosion resistance. The present inventors investigated a causal factor for the generation of red rust in a salt damage-free region, and a nitrate ion was found to be the cause. In view of this result, a compound having a standard electrode potential lower than that of a nitrate ion (0.832 V) is blended as an anti-corrosive pigment in the undercoating film of the coated steel sheet according to the present invention. Blending a compound having a standard electrode potential lower than that of a nitrate ion as an anti-corrosive pigment enables inhibition of the generation of red rust on an exposed base steel portion through the decomposition of a nitrate ion transferred from the outside to the exposed base steel portion. In particular, addition of a compound having a standard electrode potential of lower than 0.6 V significantly enhances the corrosion resistance. A compound having a standard electrode potential lower than that of a nitrate ion (0.832 V) can decompose a nitrate ion, which is harmful to the corrosion resistance, but in the case that the standard electrode potential is 0.6 V or higher, the compound preferentially reacts with an exposed metal other than a base steel, especially a basic plating layer metal. As a result, use of such a compound as an anti-corrosive pigment provides a base steel with insufficient corrosion prevention, which may lead to the degradation of red rust resistance. In contrast, use of a compound having a standard electrode potential lower than 0.6 V as an anti-corrosive pigment never causes the degradation of red rust resistance. Specifically, one or two or more compounds selected from the group consisting of a divalent tin salt, a trivalent vanadium salt, a tetravalent vanadium salt, a tetravalent molybdenum salt, an oxycarboxylate salt, ascorbic acid, a phosphite salt, and a hypophosphite salt are blended in the undercoating film. The following is just for reference: the standard electrode potential of phosphorous acid is 0.28 V; the standard electrode potential of vanadium (IV) oxide is 0.52 V; the standard electrode potential of vanadium (III) oxide is 0.53 V; the standard electrode potential of molybdenum (IV) oxide is 0.32 V; the standard electrode potential of tin (II) oxide is 0.09 V; the standard electrode potential of hypophosphorous acid is 0.50 V; the standard electrode potential of ascorbic acid is 0.34 V; the standard electrode potential of tartaric acid is 0.24 V; the standard electrode potential of phosphoric acid is 0.90 V; the standard electrode potential of vanadium (V) oxide is 1.24 V; and the standard electrode potential of molybdenum (VI) oxide is 0.61 V.

The total amount of the anti-corrosive pigment to be blended is not particularly limited, but is preferably in the range of 1 to 50 vol % and more preferably in the range of 5 to 20 vol % based on the solid content of the undercoating film. If the total amount to be blended is less than 1 vol %, the corrosion resistance could not be enhanced effectively. If the total amount to be blended is more than 50 vol %, the coatability, processability, and/or adhesion to the coating film may be deteriorated.

An additional anti-corrosive pigment may be further blended in addition to the above anti-corrosive pigment. Since the above anti-corrosive pigment has a high solubility, a metal phosphate having a low solubility may be further blended as an anti-corrosive pigment in order to maintain the corrosion resistance for a longer period, for example. Here, "low solubility" means that the solubility at 25° C. is 0.5 (g/100 g-H$_2$O) or lower. Examples of such a metal phosphate include magnesium phosphate (0.02), calcium phosphate (0.003), zinc phosphate (0.002), magnesium hydrogenphosphate (0.025), calcium hydrogenphosphate (0.02), zinc hydrogenphosphate (0.02), zinc phosphite (0.1), and magnesium phosphite (0.25). A numerical value set forth after each compound is the solubility (g/100 g-H$_2$O, at 25° C.) of the compound. Just for reference, the solubility of calcium hypophosphate is 16.7; the solubility of calcium phosphite is 1.00; the solubility of strontium phosphite is 1.10; and the solubility of barium phosphite is 0.687.

An aggregate is blended in the undercoating film from the viewpoint of enhancement of the scratch resistance. Addition of an aggregate into the undercoating film to increase the surface roughness of the undercoating film broadens the contact area between the undercoating film and a topcoating film, which enhances the adhesion strength of the topcoating film to the undercoating film. As a result, enhancement of the scratch resistance of the coated steel sheet is achieved.

As described above, a compound having a standard electrode potential lower than that of a nitrate ion (the anti-corrosive pigment) is easily eluted from the undercoating film due to the high solubility of the compound. In such a circumstance, blending a microporous particle as an aggregate in the undercoating film promotes elution of the anti-corrosive pigment through voids in the aggregate, and the corrosion resistance may be lost in a short period. In view of this, a primary particle is blended as an aggregate in the coated steel sheet according to the present invention. Here, a "microporous particle" refers to a particle including a micropore which can serve as a pathway for the anti-corrosive pigment, and the concept includes an agglomerate of fine particles and a particle having a porous structure. A "primary particle" refers to a particle including no micropores which can serve as a pathway for the anti-corrosive pigment. A primary particle may include a recessed portion which does not serve as a pathway for the anti-corrosive pigment. For example, the aggregate is a primary particle containing a resin (resin particle) such as an acrylic resin, a polyurethane, a polyester, a melamine resin, a urea resin, and a polyamide; or a primary particle containing an inorganic compound (inorganic particle) such as glass, silicon carbide, boron nitride, zirconia, and alumina-silica. The shape of these primary particles is preferably generally spherical, but may be another shape such as a cylinder and a disc.

The particle diameter of the aggregate is not particularly limited, but preferably satisfies Expression 1 and Expression 2. In Expression 1 and Expression 2, $D_{10}$ is the 10% particle diameter (μm) of the aggregate in the number-based cumulative particle size distribution; $D_{90}$ is the 90% particle diameter (μm) of the aggregate in the number-based cumulative particle size distribution; and T is the film thickness (μm) of the undercoating film at a portion containing none of the aggregate. If Expression 1 is not satisfied, the surface roughness of the undercoating film is lowered, and the scratch resistance could not be enhanced effectively. If Expression 2 is not satisfied, the aggregate is likely to be detached from the undercoating film, and the scratch resistance may be lowered.

$$D_{10} \geq 0.6T \qquad (1)$$

$$D_{90} < 2.0T \qquad (2)$$

The particle diameters in Expression 1 and Expression 2 are measured by using, for example, a Coulter counter method. However, the scratch resistance can be enhanced effectively even when particle diameters measured by using another measurement method are used, as long as the particle diameters satisfy Expression 1 and Expression 2. For example, the particle diameter of the aggregate in the undercoating film can be measured in accordance with the following procedure. First, the coated steel sheet is cut and the cut surface is polished. The cut surface is then observed with an electron microscope to acquire a cross-sectional image of the undercoating film. Next, the long side length and the short side length are measured for all of the aggregates present in the view of the cross-sectional image to calculate the average particle size for each aggregate. Subsequently, the number of particles is counted in the order of particle size from the smallest, and the particle diameter at 10% of the total number of particles is determined as $D_{10}$, and the particle diameter at 90% of the total number of particles is determined as $D_{90}$.

The amount of the aggregate to be blended is not particularly limited, but is preferably in the range of 1 vol % or more and less than 10 vol % based on the solid content of the undercoating film. If the total amount to be blended is less than 1 vol %, the scratch resistance could not be enhanced effectively. And since the amount of the aggregate, which serves as a barrier against elution of the anti-corrosive pigment, is small, the anti-corrosive pigment is excessively eluted, and the corrosion resistance may be lost in a short period. If the total amount to be blended is 10 vol % or more, elution of the anti-corrosive pigment is excessively inhibited, and the corrosion resistance may be lowered.

The film thickness of the undercoating film is not particularly limited, but is preferably in the range of 1 to 10 μm. If the film thickness is smaller than 1 μm, the corrosion resistance could not be enhanced sufficiently. On the other hand, if the film thickness is larger than 10 μm, a pinhole is likely to be generated in drying a coating material, and the appearance of the coated steel sheet may be deteriorated (such as the generation of a pinhole in drying a coating material) or the processability of the coated steel sheet may be lowered. In addition, setting the film thickness of the undercoating film to be larger than 10 μm is not cost-effective.

The undercoating film can be formed by using a known method, for example, by applying an undercoat containing the base resin, the anti-corrosive pigment, and the aggregate on the surface of the non-coated sheet (steel sheet) and baking to an ultimate sheet temperature of 150 to 280° C. for 10 to 60 seconds. If the baking temperature is lower than 150° C., the coating material cannot be baked sufficiently and the function of the undercoating film may not be exerted sufficiently. On the other hand, if the baking temperature is higher than 280° C., baking is excessive and the adhesion between the undercoating film and a topcoating film may be lowered. The method for applying the undercoat is not particularly limited, and can be appropriately selected from methods used in manufacturing a precoated steel sheet. Examples of such an application method include a roll coating method, a flow coating method, a curtain flow method, and a spraying method.

(Topcoating Film)

A topcoating film is formed on the undercoating film. The topcoating film enhances the designability, corrosion resistance, etc. of the coated steel sheet.

The type of a resin (base resin) contained in the topcoating film is not particularly limited. Examples of the resin contained in the topcoating film include a polyester, an epoxy resin, and an acrylic resin. These resins may be crosslinked with a curing agent. The type of the curing agent can be appropriately selected in accordance with, for example, the type of a resin to be used and baking conditions. Examples of the curing agent include melamine compounds and isocyanate compounds. Examples of the melamine compound include imino group-type, methylolimino group-type, methylol group-type, and complete alkyl group-type melamine compounds.

The topcoating film may be clear, or may be colored by blending an arbitrary coloring pigment. Examples of the coloring pigment include inorganic pigments such as titanium oxide, calcium carbonate, carbon black, iron black, titanium yellow, red iron oxide, iron blue, cobalt blue, cerulean blue, ultramarine, cobalt green, and molybdenum red; calcined composite oxide pigments containing a metal component such as CoAl, CoCrAl, CoCrZnMgAl, CoNiZnTi, CoCrZnTi, NiSbTi, CrSbTi, FeCrZnNi, MnSbTi, FeCr, FeCrNi, FeNi, FeCrNiMn, CoCr, Mn, Co, and SnZnTi; metallic pigments such as Al, a resin-coated Al, and Ni; and organic pigments such as Lithol Red B, Brilliant Scarlet G, Pigment Scarlet 3B, Brilliant Carmine 6B, Lake Red C, Lake Red D, Permanent Red 4R, Bordeaux 10B, Fast Yellow G, Fast Yellow 10G, Para Red, Watching Red, Benzidine Yellow, Benzidine Orange, Bon-maroon L, Bon-maroon M, Brilliant Fast Scarlet, Vermillion Red, Phthalocyanine Blue, Phthalocyanine Green, Fast Sky Blue, and Aniline Black. An additional pigment such as an extender pigment may be blended in the topcoating film. Examples of the extender pigment include barium sulfate, titanium oxide, silica, and calcium carbonate.

The film thickness of the topcoating film is not particularly limited, but is preferably in the range of 5 to 30 µm. If the film thickness is smaller than 5 µm, a desired appearance could not be imparted. On the other hand, if the film thickness is larger than 30 µm, a pinhole is likely to be generated in drying a coating material, and the appearance of the coated steel sheet may be deteriorated (such as the generation of a pinhole in drying a coating material) or the processability of the coated steel sheet may be lowered.

The topcoating film can be formed by using a known method, for example, by applying a topcoat containing the base resin, the coloring pigment, and the extender pigment on the surface of the non-coated sheet (steel sheet) and baking to an ultimate sheet temperature of 150 to 280° C. for 20 to 80 seconds. If the baking temperature is lower than 150° C., the coating material cannot be baked sufficiently and the function of the topcoating film may not be exerted sufficiently. On the other hand, if the baking temperature is higher than 280° C., the properties such as processability, weatherability, and corrosion resistance could not be exerted sufficiently due to the oxidative degradation of the resin caused by excessive baking. The method for applying the topcoat is not particularly limited, and can be appropriately selected from methods used in manufacturing a precoated steel sheet. Examples of such an application method include a roll coating method, a flow coating method, a curtain flow method, and a spraying method.

(Back Coating Film)

The coated steel sheet according to the present invention may include a coating film (back coating film) also on the surface opposite to the surface on which the undercoating film and the topcoating film are formed. The back coating film may have a 1-coat configuration or 2-coat configuration. The type of a resin contained in the back coating film, the type of the pigment, etc. are not particularly limited. The back coating film can be formed by, for example, applying a known coating material by using a known method.

(Effect)

The coated steel sheet according to the present invention can prevent the generation of red rust on an exposed base steel portion of the coated steel sheet, such as an edge surface and a bent portion, because the undercoating film contains the anti-corrosive pigment, which is easily eluted into the undercoating film. The coated steel sheet according to the present invention can prevent an excessive elution of the anti-corrosive pigments and has an excellent scratch resistance, because the undercoating film contains the aggregate consisting of a primary particle. It follows that the coated steel sheet according to the present invention is excellent in short-term and long-term corrosion resistances and scratch resistance. Accordingly, the coated steel sheet according to the present invention is suitable for an exterior building material for a building, for example, to be used for a part which may be exposed to the outside air and irradiated with the sun light.

Hereinafter, the present invention will be described in detail with reference to Examples, but the present invention is never limited to these Examples.

Examples

1. Production of Coated Steel Sheet

For a non-coated sheet, a hot-dip 55% Al—Zn alloy-plated steel sheet (base material: SPCC, amount of plating deposition on both sides: 150 g/m$^2$) was prepared. The surface of the non-coated sheet was alkali-degreased, and then subjected to chemical conversion treatment with an application type chromium-free chemical conversion treatment solution (Parcoat CT-E200; Nihon Parkerizing Co., Ltd.).

On the surface of the non-coated sheet after the chemical conversion treatment was applied an undercoat with a roll coater, and dried to an ultimate sheet temperature of 200° C. for 30 seconds to form an undercoating film having a film thickness of 2 to 8 µm. The undercoat was prepared by adding 5 vol % of barium sulfate as an extender pigment to a commercially available epoxy clear coating material (NSC 680; Nippon Fine Coatings Co., Ltd.) to form a base material, and further adding an anti-corrosive pigment and/or an aggregate listed in Table 1 and Table 2 to the base material. The particle diameters ($D_{10}$ and $D_{90}$) of the aggregate were particle diameters in the number-based cumulative particle size distribution determined by using a Coulter counter method, and they were adjusted with a sieve.

Subsequently, a topcoat was applied on the surface of the undercoating film with a roll coater, and dried to an ultimate sheet temperature of 220° C. for 45 seconds to form an topcoating film having a film thickness of 10 µm. The topcoat was prepared by adding 7 vol % of carbon black as a coloring pigment to a commercially available polyester clear coating material (CA; Nippon Fine Coatings Co., Ltd.).

The configuration of the undercoating film of each coated steel sheet produced is listed in Table 1 and Table 2. In the column "Type" in "Aggregate" in each of Table 1 and Table 2, "A1" denotes an acrylic resin particle (primary particle) (Art-pearl J-4P; Negami Chemical Industrial Co., Ltd.); "A2" denotes an acrylic resin particle (primary particle) (TAFTIC FH-S010; Toyobo Co., Ltd.); "A3" denotes an acrylic resin particle (primary particle) (TAFTIC FH-S005; Toyobo Co., Ltd.); "A4" denotes an acrylic resin particle (primary particle) (TAFTIC FH-S008; Toyobo Co., Ltd.); "A5" denotes an acrylic resin particle (primary particle) (Art-pearl J-5P; Negami Chemical Industrial Co., Ltd.); "A6" denotes an acrylic resin particle (primary particle) (Art-pearl J-7P; Negami Chemical Industrial Co., Ltd.); "B" denotes a urethane resin particle (primary particle) (Art-pearl P-800T; Negami Chemical Industrial Co., Ltd.); "C" denotes a glass particle (primary particle) (EMB-10; Potters-Ballotini Co., Ltd.); and "D" denotes a hard silica particle (microporous particle) (Sylysia 430; Fuji Silysia chemical Ltd.). In the column "Type" in "Anti-corrosive pigment" in Table 1 and Table 2, "a" denotes magnesium phosphite (Taihei Chemical Industrial Co., Ltd.); "b" denotes vanadium tetroxide; "c" denotes vanadium (III) oxide; "d" denotes molybdenum (IV) oxide; "e" denotes tin (II) oxide; "f" denotes magnesium hypophosphite (Taihei Chemical Industrial Co., Ltd.); "g" denotes manganese phosphite (KIKUCHI COLOR & CHEMICALS CORPORATION); "h" denotes ascorbic acid; "i" denotes tartaric acid; "j" denotes magnesium phosphate (KIKUCHI COLOR & CHEMICALS CORPORATION); "k" denotes zinc phosphate (KIKUCHI COLOR & CHEMICALS CORPORATION); "l" denotes aluminum phosphate (Taihei Chemical Industrial Co., Ltd.); "m" denotes manganese phosphate (KIKUCHI COLOR & CHEMICALS CORPORATION); "n" denotes vanadium (V) oxide; and "o" denotes molybdenum (VI) oxide. In Table 1 and Table 2, "Amount of blending" for the aggregate and the anti-corrosive pigments is a percentage (vol %) based on the solid content of the undercoating film.

TABLE 1

| | | Undercoating film | | | | | | | | | |
|---|---|---|---|---|---|---|---|---|---|---|---|
| | | Aggregate | | | Anti-corrosion pigment 1 | | Anti-corrosion pigment 2 | | Anti-corrosion pigment 3, 4 | | |
| No. | Type | $D_{10}$ (μm) | $D_{90}$ (μm) | Amount of blending (vol %) | Type | Amount of blending (vol %) | Type | Amount of blending (vol %) | Type | Amount of blending (vol %) | Film thickness (μm) | Classification |
| 1 | A1 | 1.5 | 3 | 3 | a | 20 | — | — | — | — | 2 | Example |
| 2 | A2 | 5 | 10 | 3 | a | 20 | — | — | — | — | 8 | Example |
| 3 | A3 | 4 | 6 | 3 | a | 20 | — | — | — | — | 4 | Example |
| 4 | A3 | 4 | 6 | 0.5 | a | 20 | — | — | — | — | 4 | Example |
| 5 | A3 | 4 | 6 | 15 | a | 20 | — | — | — | — | 4 | Example |
| 6 | A4 | 2 | 10 | 3 | a | 20 | — | — | — | — | 4 | Example |
| 7 | A5 | 2 | 6 | 3 | a | 20 | — | — | — | — | 4 | Example |
| 8 | A5 | 2 | 6 | 3 | a | 20 | — | — | — | — | 3 | Example |
| 9 | A4 | 2 | 10 | 0.5 | a | 20 | — | — | — | — | 4 | Example |
| 10 | A5 | 2 | 6 | 0.5 | a | 20 | — | — | — | — | 4 | Example |
| 11 | A5 | 2 | 6 | 0.5 | a | 20 | — | — | — | — | 3 | Example |
| 12 | A4 | 2 | 10 | 15 | a | 20 | — | — | — | — | 4 | Example |
| 13 | A5 | 2 | 6 | 15 | a | 20 | — | — | — | — | 4 | Example |
| 14 | A5 | 2 | 6 | 15 | a | 20 | — | — | — | — | 3 | Example |
| 15 | A3 | 4 | 6 | 3 | b | 20 | — | — | — | — | 4 | Example |
| 16 | A3 | 4 | 6 | 3 | c | 20 | — | — | — | — | 4 | Example |
| 17 | A3 | 4 | 6 | 3 | d | 20 | — | — | — | — | 4 | Example |
| 18 | A3 | 4 | 6 | 3 | e | 20 | — | — | — | — | 4 | Example |
| 19 | A3 | 4 | 6 | 3 | f | 20 | — | — | — | — | 4 | Example |
| 20 | A3 | 4 | 6 | 3 | g | 20 | — | — | — | — | 4 | Example |

TABLE 2

| | | Undercoating film | | | | | | | | | |
|---|---|---|---|---|---|---|---|---|---|---|---|
| | | Aggregate | | | Anti-corrosion pigment 1 | | Anti-corrosion pigment 2 | | Anti-corrosion pigment 3, 4 | | |
| No. | Type | $D_{10}$ (μm) | $D_{90}$ (μm) | Amount of blending (vol %) | Type | Amount of blending (vol %) | Type | Amount of blending (vol %) | Type | Amount of blending (vol %) | Film thickness (μm) | Classification |
| 21 | A3 | 4 | 6 | 3 | h | 20 | — | — | — | — | 4 | Example |
| 22 | A3 | 4 | 6 | 3 | i | 20 | — | — | — | — | 4 | Example |
| 23 | B | 4 | 10 | 3 | a | 20 | — | — | — | — | 6 | Example |
| 24 | C | 3 | 8 | 3 | a | 20 | — | — | — | — | 5 | Example |
| 25 | A3 | 4 | 6 | 3 | a | 10 | j | 10 | — | — | 4 | Example |
| 26 | A3 | 4 | 6 | 3 | a | 10 | j | 5 | k | 5 | 4 | Example |
| 27 | A3 | 4 | 6 | 3 | a | 10 | j | 4 | k / l | 3 / 3 | 4 | Example |
| 28 | A3 | 4 | 6 | 3 | a | 10 | k | 10 | — | — | 4 | Example |
| 29 | A3 | 4 | 6 | 3 | a | 10 | l | 10 | — | — | 4 | Example |
| 30 | A6 | 2 | 9 | 3 | a | 10 | j | 10 | — | — | 4 | Example |
| 31 | D | 4 | 6 | 3 | a | 20 | — | — | — | — | 4 | Comparative Example |
| 32 | D | 4 | 6 | 3 | g | 20 | — | — | — | — | 4 | Comparative Example |
| 33 | A3 | 4 | 6 | 3 | j | 20 | — | — | — | — | 4 | Comparative Example |
| 34 | A3 | 4 | 6 | 3 | m | 20 | — | — | — | — | 4 | Comparative Example |
| 35 | A3 | 4 | 6 | 3 | n | 20 | — | — | — | — | 4 | Comparative Example |

TABLE 2-continued

| | Aggregate | | | Anti-corrosion pigment 1 | | Anti-corrosion pigment 2 | | Anti-corrosion pigment 3, 4 | | | |
|---|---|---|---|---|---|---|---|---|---|---|---|
| No. | Type | $D_{10}$ (μm) | $D_{90}$ (μm) | Amount of blending (vol %) | Type | Amount of blending (vol %) | Type | Amount of blending (vol %) | Type | Amount of blending (vol %) | Film thickness (μm) | Classification |
| 36 | A3 | 4 | 6 | 3 | o | 20 | — | — | — | — | 4 | Comparative Example |
| 37 | D | 4 | 6 | 3 | j | 20 | — | — | — | — | 4 | Comparative Example |
| 38 | — | — | — | — | j | 20 | — | — | — | — | 4 | Comparative Example |
| 39 | — | — | — | — | a | 20 | — | — | — | — | 4 | Comparative Example |
| 40 | A3 | 4 | 6 | 3 | — | — | — | — | — | — | 4 | Comparative Example |
| 41 | D | 4 | 6 | 3 | — | — | — | — | — | — | 4 | Comparative Example |

2. Test for Evaluation (1) Corrosion Resistance Test

A sheet was cut out of each of the coated steel sheets through shearing, and the sheet was bent at a load of 2 t to prepare a test piece. The test piece had a cut edge surface and a bent portion, and the base steel and the plating metal were exposed at these portions.

The test pieces were placed outside in Kiryu city, Gunma prefecture, Japan (salt damage-free region), and subjected to atmospheric exposure tests for two months and a year. Each of the test pieces placed were oriented to the south at an inclination angle of 35° so that the bent portion was in the lower side of the test piece. Two months and a year after the initiation of exposure, the area fraction of red rust generation was measured for the exposed base steel portions of the cut edge surface and the bent portion. The case that the area fraction of red rust generation was less than 10% was rated as "A", the case that the area fraction of red rust generation was 10% or more and less than 30% was rated as "B", the case that the area fraction of red rust generation was 30% or more and less than 60% was rated as "C", and the case that the area fraction of red rust generation was 60% or more was rated as D. A coated steel sheet having a grade of "A", "B", or "C" can be regarded as a coated steel sheet having a required corrosion resistance.

(2) Scratch Resistance Test

As it was contemplated that a coated steel sheet is scratched in handling thereof and construction therewith, a scratch resistance test was conducted with a Clemens type scratch hardness tester. Two sheets (a sheet for evaluation and a sheet for scratching) were cut out of each of the coated steel sheets through shearing. The sheet for evaluation was horizontally placed and the sheet for scratching was disposed thereon so that the inclination angle to the surface of the sheet for evaluation was 45°. The coating film of the sheet for evaluation was scratched with the sheet for scratching with a predetermined load applied to the sheet for scratching, and the minimum load when the plating layer was observed was recorded as the evaluation value. The case that the evaluation value was 1,000 g or higher was rated as "A", the case that the evaluation value was 800 g or higher and lower than 1,000 g was rated as "B", the case that the evaluation value was 500 g or higher and lower than 800 g was rated as "C", and the case that the evaluation value was lower than 500 g was rated as D. A coated steel sheet having a grade of "A", "B", or "C" can be regarded as a coated steel sheet having a required scratch resistance.

(3) Evaluation Result

The evaluation results of the corrosion resistance test and the scratch resistance test for the coated steel sheets are shown in Table 3.

TABLE 3

| | Corrosion resistance | | | | | |
|---|---|---|---|---|---|---|
| | Exposure for 2 months | | Exposure for 1 year | | | |
| No. | Edge surface | Bent portion | Edge surface | Bent portion | Scratch resistance | Classication |
| 1 | A | A | B | A | A | Example |
| 2 | A | A | A | A | A | Example |
| 3 | A | A | A | A | A | Example |
| 4 | A | A | B | B | B | Example |
| 5 | B | A | B | A | A | Example |
| 6 | A | A | A | A | C | Example |
| 7 | A | A | A | A | B | Example |
| 8 | A | A | A | A | B | Example |
| 9 | A | A | B | B | C | Example |
| 10 | A | A | B | B | C | Example |
| 11 | A | A | B | B | C | Example |
| 12 | B | A | B | A | C | Example |
| 13 | B | A | B | A | B | Example |
| 14 | B | A | B | A | B | Example |
| 15 | A | A | A | A | A | Example |
| 16 | A | A | A | A | A | Example |
| 17 | A | A | A | A | A | Example |
| 18 | A | A | A | A | A | Example |
| 19 | A | A | A | A | A | Example |
| 20 | A | A | A | A | A | Example |
| 21 | A | A | A | A | A | Example |
| 22 | A | A | A | A | A | Example |
| 23 | A | A | A | A | A | Example |
| 24 | A | A | A | A | B | Example |
| 25 | A | A | B | A | A | Example |
| 26 | A | A | B | A | A | Example |
| 27 | A | A | A | A | A | Example |
| 28 | A | A | B | A | A | Example |
| 29 | A | A | B | A | A | Example |
| 30 | A | A | B | A | C | Example |
| 31 | B | B | D | D | A | Comparative Example |
| 32 | B | B | D | D | A | Comparative Example |
| 33 | D | D | D | D | A | Comparative Example |

TABLE 3-continued

| | Corrosion resistance | | | | | |
|---|---|---|---|---|---|---|
| | Exposure for 2 months | | Exposure for 1 year | | | |
| No. | Edge surface | Bent portion | Edge surface | Bent portion | Scratch resistance | Classication |
| 34 | D | D | D | D | A | Comparative Example |
| 35 | D | D | D | D | A | Comparative Example |
| 36 | C | C | D | D | A | Comparative Example |
| 37 | D | D | D | D | A | Comparative Example |
| 38 | D | D | D | D | D | Comparative Example |
| 39 | A | A | D | D | D | Comparative Example |
| 40 | D | D | D | D | A | Comparative Example |
| 41 | D | D | D | D | A | Comparative Example |

As shown in Table 3, coated steel sheets Nos. 38 and 39, in which an aggregate was not added into the undercoating film, were poor in scratch resistance. Coated steel sheets Nos. 31, 32, and 37, in which an aggregate consisting of a microporous particle was added into the undercoating film, were excellent in scratch resistance, but poor in long-term corrosion resistance. The reason for the poor long-term corrosion resistance of coated steel sheets Nos. 31 and 32 is presumably that, since the aggregate was a microporous particle, the anti-corrosive pigment was eluted to the outside in a short period through voids (micropores) in the aggregate. Coated steel sheet No. 37 was poor also in short-term corrosion resistance because the standard electrode potential of the anti-corrosive pigment was higher than that of a nitrate ion.

Coated steel sheets Nos. 33 to 35, in which only a compound having a standard electrode potential higher than that of a nitrate ion was added as an anti-corrosive pigment into the undercoating film, and coated steel sheets Nos. 40 and 41, in which an anti-corrosive pigment was not added into the undercoating film, were poor in short-term and long-term corrosion resistances. Coated steel sheet No. 36, in which only a compound having a standard electrode potential of 0.6 V or higher and 0.832 V (the standard electrode potential of a nitrate ion) or lower (molybdenum (VI) oxide) was added as an anti-corrosive pigment, was poor in long-term corrosion resistance. This is presumably because molybdenum (VI) oxide preferentially reacted with the basic plating layer metal.

On the other hand, coated steel sheets Nos. 1 to 30, in which a predetermined amount of an anti-corrosive pigment(s) and an aggregate consisting of a primary particle were added into the undercoating film, were excellent in short-term and long-term corrosion resistances and scratch resistance.

From the above results, it can be seen that the coated steel sheet according to the present invention is excellent in both corrosion resistance and scratch resistance.

This application claims the priority of Japanese Patent Application No. 2014-56502 filed on Mar. 19, 2014, the entire contents of which including the specification and drawings are incorporated herein by reference.

INDUSTRIAL APPLICABILITY

The coated steel sheet according to the present invention is excellent in both corrosion resistance and scratch resistance, and thus is useful for exterior building materials for a building, for example.

The invention claimed is:

1. A coated steel sheet comprising:
a steel sheet;
an undercoating film disposed on the steel sheet, containing an anti-corrosive pigment and an aggregate being an primary particle, and not containing microporous particle; and
a topcoating film disposed on the undercoating film, wherein
the anti-corrosive pigment is one or two or more compounds selected from the group consisting of a divalent tin salt, a trivalent vanadium salt, a tetravalent vanadium salt, a tetravalent molybdenum salt, an oxycarboxylate salt, ascorbic acid, a phosphite salt, and a hypophosphite salt,
the aggregate satisfies Expression 1 and Expression 2:

$$D_{10} \geq 0.6T \quad \text{(Expression 1)}$$

$$D_{90} < 2.0T \quad \text{(Expression 2)}$$

wherein $D_{10}$ is a 10% article diameter (μm) of the aggregate in a number-based cumulative particle size distribution; $D_{90}$ is a 90% article diameter (μm) of the aggregate in a number-based cumulative particle size distribution; and T is a film thickness (μm) of the undercoating film at a portion containing none of the aggregate.

2. The coated steel sheet according to claim 1, wherein a percentage of the aggregate based on a solid content of the undercoating film is 1 vol % or more and less than 10 vol %.

3. The coated steel sheet according to claim 1, wherein the steel sheet has been subjected to chromium-free chemical conversion treatment.

4. An exterior building material comprising the coated steel sheet according to claim 1.

* * * * *